Nov. 18, 1958   J. W. WHALEN   2,860,901
SEALING RING
Filed March 25, 1955
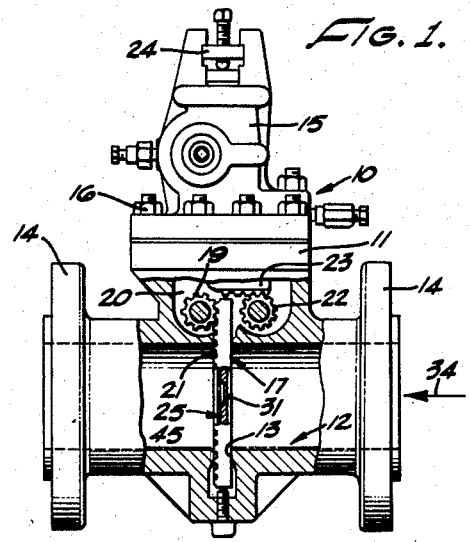
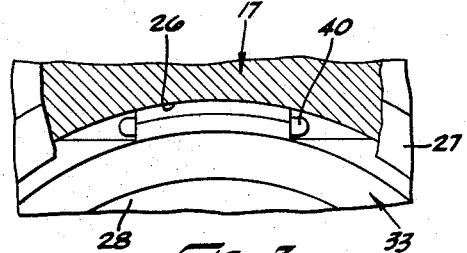
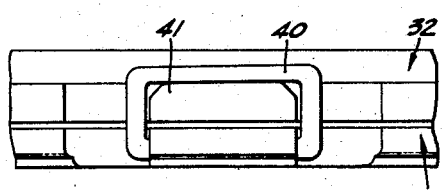
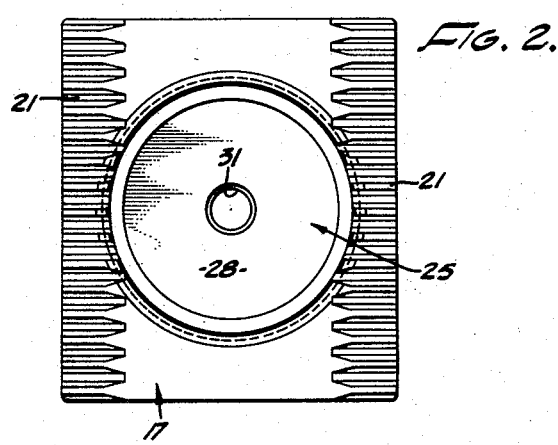
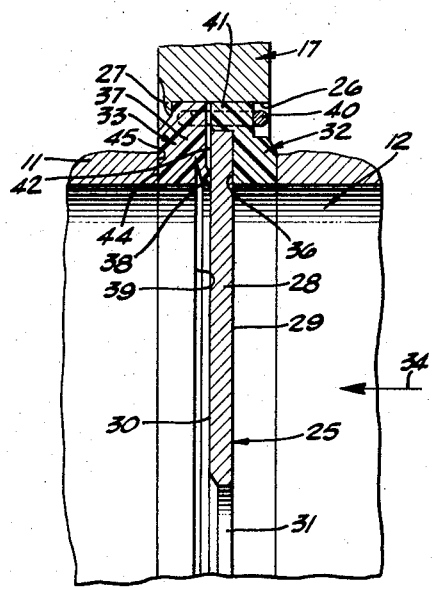
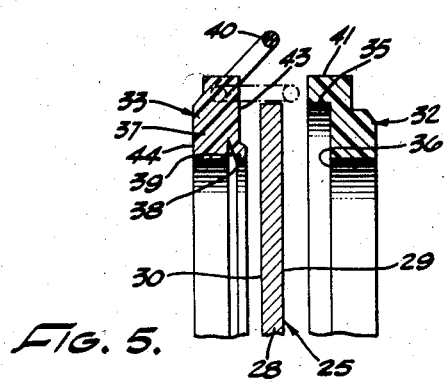
JOHN W. WHALEN
INVENTOR.
BY
ATTORNEYS

United States Patent Office 2,860,901
Patented Nov. 18, 1958

2,860,901

SEALING RING

John W. Whalen, Inglewood, Calif., assignor to Daniel Orifice Fitting Company, Los Angeles, Calif., a corporation of California Application March 25, 1955, Serial No. 496,669

2 Claims. (Cl. 288—33)

This invention relates to orifice fitting assemblies of the type shown in my Patent No. 2,687,748 granted August 31, 1954.

It is the principal object of the present invention to provide a novel form of orifice plate assembly which employs a minimum number of component parts and which may be mounted on a plate carrier of the type shown in the Daniels Patents No. 1,965,826, No. 1,996,192, and No. 2,407,951.

A more particular object is to provide an orifice plate assembly having a sealing ring formed of non-metallic material and provided with an integral axially extending sealing rib for contacting the downstream face of the orifice plate.

Another object is to provide a device of this type which is rugged and durable and characterized by long trouble-free service.

Other and more detailed objects and advantages will appear more fully hereinafter.

In the drawings:

Figure 1 is a side elevation partly broken away showing an orifice fitting apparatus of the type to which my invention is directed.

Figure 2 is a front elevation of the plate carrier showing an orifice plate assembly therein of the type embodying my invention.

Figure 3 is a fragmental sectional view showing the mounting of the orifice plate assembly with respect to the carrier.

Figure 4 is a plan view partly broken away showing the parts of Figure 3.

Figure 5 is a transverse sectional view showing the parts prior to assembly.

Figure 6 is a sectional view showing the parts in operative position.

Referring to the drawings:

The orifice fitting device generally designated 10 includes a body 11 having an axial flow passageway 12 and a transverse slot 13 intersecting the passageway 12. Flanges 14 are provided for connection to the upstream and downstream pipes, not shown. A chamber housing 15 is fixed to the body 11 by means of the bolts 16. A plate carrier 17 is mounted in the transverse slot 13, and gears 19 within the body cavity 20 mesh with rack teeth 21 formed on the carrier 17. The carrier may thus be moved from its operative position within the slot 13 to an inoperative position within the housing 15. A gear 22 within the cavity 20 serves to open and close a sliding valve 23 which normally forms a seal between the cavity 20 and the interior of the housing 15. The carrier 17 may be moved upward through the housing 15 to emerge from the top thereof after the releasable sealing assembly 24 has been removed from the upper part of the housing 15.

In accordance with my present invention, I provide a novel form of orifice plate assembly generally designated 25. This assembly is adapted to be mounted on the carrier 17. As best shown in Figure 6, the carrier 17 is provided with an axial bore 26 which is larger in diameter than the flow passageway 12 in the body 11. The bore 26 terminates in an inwardly extending flange 27. The assembly 25 is axially insertable into the bore 26 and engages the flange 27.

The orifice plate assembly 25 includes the disk-like orifice plate 28 having parallel side faces 29 and 30 and provided with a central opening 31. This opening may be chamfered adjacent the downstream face 30. The assembly 25 also includes the compression ring 32 and the sealing ring 33. The compression ring 32 may be formed of metal or any other suitable material but the sealing ring 33 is formed of a non-metallic resilient material such as, for example, the material marketed under the trade-name "Teflon" by E. I. du Pont de Nemours & Co., Wilmington, Delaware. The outer peripheries of the rings 32 and 33 fit slidably within the bore 26 in the plate carrier 17. The flow through the passage 12 occurs in the direction of the arrow 34, as shown in Figures 1 and 6. The compression ring 32 is counterbored at 35 to receive the outer periphery of the orifice plate 28 and the annular shoulder 36 on the compression ring 32 engages a portion of the upstream face 29 of the orifice plate 28. The sealing ring 33 includes a relatively large and massive body portion 37 and a relatively small sealing rib 38 formed integrally therewith. This sealing rib is separated from the main body portion 37 by means of a circular groove 39 projecting outwardly from the inner periphery of the sealing ring. The rib 38 projects axially in a direction toward the downstream face 30 of the orifice plate 28.

Retaining elements are provided for holding the parts 28, 32, and 33, against axial disassembly. These retaining elements include wire loops each pivotally mounted on the sealing ring 33. Each of these loops is adapted to engage over an upstanding abutment 41 provided on the compression ring 32. When the loops 40 are in operative position, as shown in Figures 3, 4, and 6, they are positioned wholly within the cylindrical outline defined by the outer periphery of the rings 32 and 33 and hence do not interfere with axial insertion of the assembly 25 into the plate carrier bore 26.

The rib 38 engages the downstream face 30 of the orifice plate 28 and the resilience or "springiness" of this rib acts in a direction tending to spread the parts 32 and 33. The metallic loops 40 limit the extent of the spreading action prior to assembly of the sealing unit 25 into the plate carrier 17.

The overall thickness of the assembly 25 is initially greater than the width of the slot 13 in the body 11. Therefore when the plate carrier 17 is lowered through the cavity 20 and into the slot 13, the compression ring 32 and sealing ring 33 are moved axially together to deflect the rib 38 slightly and reduce the width of the groove 39. This also reduces the clearance space 42 between the radial face 43 on the sealing ring 33 and the face 30 of the orifice plate 28. When the parts are in operative position, the surface 44 on the sealing ring engages the annular sealing surface 45 on the body 11.

Upon removal of the plate carrier 17 from the device 10, the retainer loops 40 may be swung to an inoperative position, as shown in Figure 5, so that the rings 32 and 33 may be separated to permit removal of the orifice plate 28 for inspection, maintenance, or replacement.

Having fully described my invention, it is to be understood that I do not wish to be limited to the details herein set forth but my invention is of the full scope of the appended claims.

I claim:

1. A sealing ring for orifice plate assemblies, comprising: a relatively massive ring member formed of yieldable non-metallic material and having substantial axial length as well as radial wall thickness; an annular groove disposed adjacent one axial end and extending radially outward from the radially inner wall of the ring member; a relatively thin flexible rib formed between said groove and the adjacent axial end of said ring member; and an axial enlargement at the radially inner portion of said rib, said enlargement normally projecting axially beyond said body and arranged for axial displacement.

2. A single-piece sealing ring and backing ring for orifice plate assemblies, comprising: a relatively massive annular body member of yieldable non-metallic material forming a backing ring; an integral, annular, flexible sealing rib at one axial end of said backing ring and complementary thereto, said sealing rib and backing ring defining therebetween an annular groove to permit axial displacement of said rib relative to said backing ring; and an annular sealing bead carried by said rib and normally projecting axially beyond said backing ring for sealing engagement with a confronting orifice plate.

References Cited in the file of this patent

UNITED STATES PATENTS

| | | |
|---|---|---|
| 2,242,467 | Hamer | May 20, 1941 |
| 2,271,282 | Young | Jan. 27, 1942 |
| 2,462,493 | Hamer | Feb. 22, 1949 |
| 2,687,748 | Whalen | Aug. 31, 1954 |